Sept. 9, 1924.
J. G. WALLMANN
1,507,643
ELECTRIC SWITCH
Filed April 10, 1922
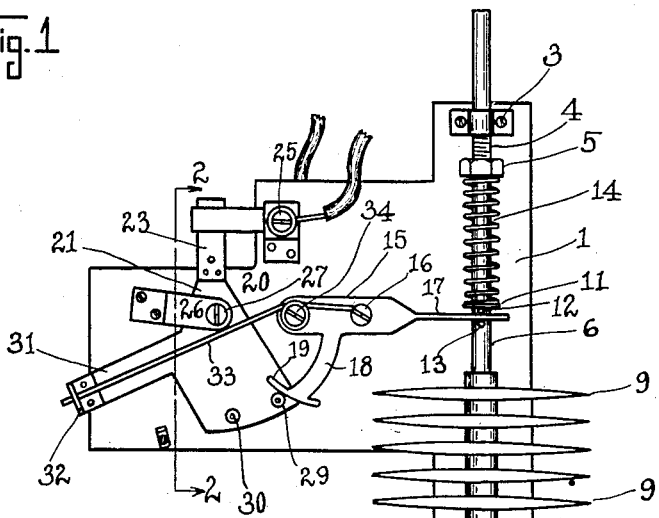
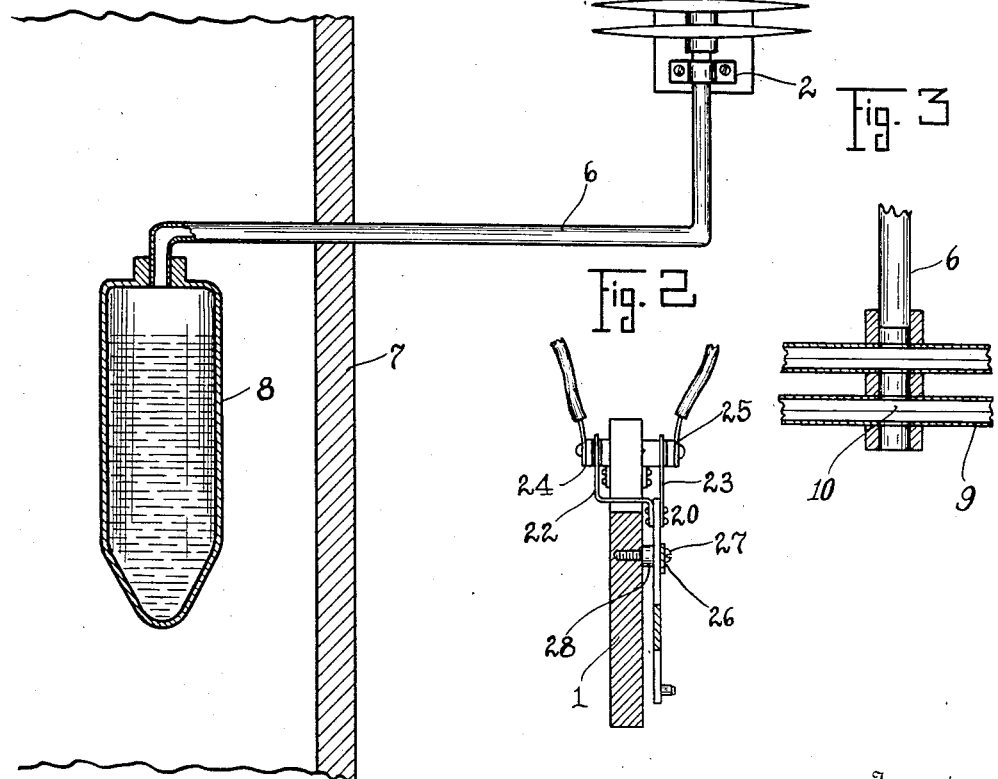
Inventor
JOHANN G. WALLMANN Patented Sept. 9, 1924.

1,507,643

UNITED STATES PATENT OFFICE.

JOHANN G. WALLMANN, OF OAKLAND, CALIFORNIA.

ELECTRIC SWITCH.

Application filed April 10, 1922. Serial No. 550,994.

*To all whom it may concern:*

Be it known that I, JOHANN G. WALLMANN, a citizen of the United States, residing at Oakland, in the county of Alameda and State of California, have invented certain new and useful Improvements in Electric Switches, of which the following is a specification.

My invention is an improved thermostatically controlled automatic electric snap switch, which is simple in construction, inexpensive to manufacture and highly efficient in operation.

Referring to the annexed drawing in which my invention is illustrated and which forms a part of this specification:

Figure 1 is a front elevation of my switch.

Figure 2 is a transverse vertical section of my switch taken on line 2—2 of Figure 1.

Figure 3 is a vertical section of the thermostatic pile.

In the drawing 1 indicates a base of insulation on which are secured two brackets 2 and 3, the bracket 3 being above the bracket 2. On the bracket 3 is formed a depending threaded sleeve 4 on which screws a nut 5. A tube 6 extends upwardly through the bracket 2, and sleeve 4 and bracket 3 and the lower end of said tube extends into a heater 7 and is connected to a container 8 in said heater, which container contains ether. On the tube 6 immediately above the bracket 2 is mounted a plurality of spaced superimposed double hollow diaphragms 9 with which said tube communicates by means of ports 10 in said tube. The uppermost diaphragm is secured to the tube 6 and the remaining diaphragms are loosely mounted on said tube with the lowermost diaphragm slightly above the bracket 2.

A collar 11 fits on the tube 6 just above the diaphragms 9 upon a pin 12 also in said tube. A pin 13 is secured in the tube 6 just below the pin 12. A spring 14 surrounds the tube 6 between the collar 11 and the nut 5. A trip lever 15 is pivoted by the pivot screw 16 to the base 1 on which lever are formed arms 17 and 18, the arm 17 extending between the pins 12 and 13. A curved trip shoe 19 is formed on the inside of the lower end of arm 18. A knife switch 20 is mounted on the base 1, said switch comprising a switch lever 21, two knife members 22 and 23 secured to said lever and two clip members 24 and 25 secured on the base 1 in position to receive the knife members 22 and 23 respectively. The lever 21 is pivoted to a bracket 26 and to the base 1 by a pivot screw 27 which extends through said bracket, the lever and a collar 28 into the base, said collar spacing the lever a short distance from the base so that it will swing freely over the base. On the lower part of the lever are two pins 29 and 30 for engaging the shoe as will be hereinafter described. An arm 31 is formed on the outer side of the lever 21 below its pivot on the end of which arm is secured an angle iron 32 through which extends one end of a spring 33, which spring is coiled around a screw 34 in the inner end of the trip lever 15 and extended to the lever pivot screw 16 and coiled at its other end around said screw.

During average temperature the parts of the device assume the position shown in Figure 1. As the temperature of the heater rises, the ether in the receptacle 8 expands in the tube 6 and diaphragms 9, which raise the upper portion of said tube in the brackets 2 and 3 and sleeve 4 against the tension of spring 14. The upward movement of the tube 6 causes the pin 13 to engage the arm 17 and swing the lever 15 counter-clockwise on its pivot, which flexes the spring 33 until the shoe 19 escapes the pin 29, whereupon said spring swings the lever 21 counter-clockwise until the switch arms 22 and 23 disengage the clips 24 and 25 respectively and the pin 30 reaches a point just above the forward end of shoe 19, thus opening the switch 20 and breaking the electric circuit including the heater 7, and shutting off the heat of said heater. As the heater cools and the ether in the tube 6, diaphragms 9 and receptacle 8 contracts, said diaphragms contract and the upper portion of said tube moves downward in brackets 2 and 3 and sleeve 4 which causes the pin 12 to engage the arm 17 and swing the trip lever 15 clockwise and the shoe 19 under the pin 30, flexing the spring 33 upwardly until the pin 30 escapes the rear end of shoe 19, whereupon the spring 33 swings the switch lever 21 quickly in a clockwise direction and the switch arms 22 and 23 into the clips 24 and 25, thus closing the switch 30 and the heater circuit.

Having described my invention, I claim:

In the switch of the character disclosed, a trip lever, a shoe on said trip lever, a switch swinging member, a pair of pins on said swinging member, a spring engaging said switch swinging member at one end and connected to the pivot of said trip lever at the other end, a screw on the end of said trip lever around which said spring coils, the other end of said trip lever being adapted to be swung by the expanding member of a thermostat, one of said pins being arranged to engage said shoe and hold said switch closed until said spring is flexed by the movement of said trip lever to a point where it springs the switch open and the other pin being arranged to engage said shoe and hold the switch open until said spring is flexed sufficiently by the action of said trip lever in the opposite direction to spring said switch closed.

In testimony whereof I affix my signature.

JOHANN G. WALLMANN